2,913,436

PHOSPHORUS-CONTAINING POLYESTERS AND METHOD FOR THEIR PRODUCTION

Wilson A. Reeves and John D. Guthrie, New Orleans, La., assignors to the United States of America as represented by the Secretary of Agriculture No Drawing. Application November 18, 1953
Serial No. 393,020

8 Claims. (Cl. 260—75)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to liquid and solid phosphorus containing polymers of the alkyd resin type.

In general this invention provides polymers consisting essentially of polyesters of at least one polycarboxylic acid and at least one polyhydric phosphorus compound of the group consisting of tetrakis(hydroxymethyl) phosphonium chloride, tris(hydroxymethyl) phosphine oxide, and phosphorous linked methylol group containing derivatives thereof.

The polymers provided by this invention can be produced in the form of liquids or solids. They can be deposited on the surfaces and/or in the interstices of hydrophilic fibrous organic materials, i.e., organic materials which absorb or adsorb water on most of their surface area. When the polymers are so deposited, they reduce the combustibility of hydrophilic fibrous organic materials and resist removal by laundering and the like chemical treatments. These polymers can also be deposited on the surfaces of non-hydrophilic materials to form flame resistant coatings. In general, they are useful as further polymerizable liquid or solid thermosetting polymers for use in the production of plastics, surface coatings, varnishes, and the like.

Hereinafter the compounds tetrakis(hydroxymethyl) phosphonium chloride and tris(hydroxymethyl) phosphine oxide are referred to by their initials THPC and THPO, respectively, and the term "phosphorus compounds" is used exclusively to refer to at least one compound of the group consisting of THPC, THPO and phosphorus linked methylol containing derivatives thereof. The phosphorus linked methylol groups containing derivatives are the products of reacting THPC, THPO, or a mixture thereof, with at least one other compound, to form a product containing at least two $PCH_2OH$ groups in which the phosphorus atoms are members of pentavalent phosphorus radicals of the group, trimethylene phosphine oxide, $(CH_2)_3PO$, and tetramethylene phosphonium chloride, $(CH_2)_4PCl$.

Illustrative examples of phosphorus compounds suitable for use in the present invention include THPC, THPO, and mixtures thereof. They also include derivatives containing phosphorus linked methylol groups, such as the products of reacting THPC, THPO, or a mixture thereof, with at least one nitrogen compound containing at least one radical of the group, hydrogen and $CH_2OH$, attached to a trivalent nitrogen atom. Such nitrogen compounds are melamine, methylolmelamine, acrylamide, diacetamide, lysine, diethanolamine, cetylamine, ethylenimine, ammonia, hydrazine, and the like; and the reaction products contain at least two $PCH_2OH$ groups in which the phosphorus atoms are members of pentavalent radicals of the group trimethylene phosphine oxide or tetramethylene phosphonium chloride.

A method of producing such derivatives of THPC and THPO, as described in the foregoing paragraph, is disclosed in our copending application, Serial No. 378,437, filed September 3, 1953, now Patent No. 2,809,941.

In general the process of the present invention comprises polyesterifying the phosphorus compounds by reacting them with polycarboxylic acid esterifying agents. Substantially any polycarboxylic acid esterifying agent, such as, the polycarboxylic acids, their anhydrides and their acyl halides can be used. Illustrative examples of suitable esterifying agents include saturated aliphatic polycarboxylic acids, such as oxalic, malonic, methylsuccinic, malic, tartaric, citric and like acids; unsaturated aliphatic polycarboxylic acids, such as maleic, itaconic, aconitic and like acids; alicyclic polycarboxylic acids, such as pinic, homopinic, the hexahydrophthalic and like acids; aromatic polycarboxylic acids, such as the phthalic, the benzenetricarboxylic, diphenic, chlorendic (1,4,5,6, 7,7-hexachlorobicyclo-[2,2,1]heptene - 2,3 - dicarboxylic acid), and the like acids; polycarboxylic acid anhydrides, such as succinic, maleic, phthalic, chlorendic, and the like acid anhydrides; and polycarboxylic acid halides, such as oxalyl, succinyl, the phthalyl, and the like acid halides.

The esterification reaction can be conducted at any temperature at which reaction occurs between the freezing point and the decomposition temperature of the reactants or the products.

The esterification reaction can be conducted in the presence or absence of the usual esterification catalysts. Examples of suitable catalysts include sulfuric, phosphoric, benzene-sulfonic, and the like acids.

The reaction can be conducted in the presence or absence of the usual esterification solvents. Examples of suitable solvents include liquid ketones, ethers, hydrocarbons, and the like.

The polymers provided by this invention vary widely in physical and chemical properties. In solid form they vary from relatively soft, pliable resins to hard and brittle resins. They vary from substantially water-white clear liquids and solids to colored and/or opaque liquids and solids. A predominant characteristic of the polymers provided by this invention is their resistance to burning.

In general the polymers provided by this invention are highly compatible with other synthetic polymers particularly with other alkyd-type resin polymers, and exhibit high compatibility with the other polymers in both the liquid and the solid state. The polymers of this invention can advantageously be used as modifiers and/or extenders for other polymers.

One method of using the polymers of this invention to modify another polymer, comprises, mixing at least one incompletely polymerized polyester of at least one polycarboxylic acid and at least one phosphorus compound with another liquid incompletely polymerized polymer and completing the polymerization of the mixture. Illustrative examples of polymers which can be modified by such a procedure include polyesters of at least one carboxylic acid and at least one polyhydric alcohol, such as, the polyesters of the phthalic acids and glycerol or pentaerythritol, the cellulose acetate, the cellulose butyrates, and the like; and polymers produced by reacting the phosphorus compounds with at least one nitrogen compound containing at least two members of the group, hydrogen and $CH_2OH$, attached to trivalent nitrogen atoms, such as, polymers produced by reacting THPC with methylol melamine, with cetylamine or with ethylenimine, and the like.

Polymers comprising polyesters of the phosphorus compounds with dicarboxylic acids are particularly valuable. Those in which dicarboxylic acid is a dicarboxylated hydrocarbon tend to exhibit a marked degree of softness and plasticity in the solid state. Generally they can readily be cut by a blunt instrument such as a spatula. Those in which the dicarboxylic acid contains polar groups, such as, halogen atoms tend to be relatively hard and brittle polymers and can scarcely be marked with a spatula. The polymers comprising polyesters of the phosphorus compounds with chlorendic acid (1,4,5,6,7,7-hexachlorobicyclo-[2,2,1]heptene-2,3-dicarboxylic acid, in addition to being relatively hard and brittle, exhibit the unique and valuable property of a relatively high solubility in liquid ketones, such as, acetone and also in liquid hydrocarbons, such as, toluene.

In the case of alkyd resins, the polymers of this invention can be copolymerized to provide a chemically bound resin modifier. For example, replacing a portion of a polyhydric alcohol monomer with a portion of the phosphorus compounds and reacting the resulting mixture with a poly-functional esterifying agent produces an alkyd type copolymer. Such copolymers, in which the proportion of the phosphorus compound exceeds that of the polyhydric alcohol, exhibit the properties of the present polymers modified by those of the polyhydric alcohol polymers, and vice versa.

Preferred phosphorus compounds for employment in the present process consist of THPO and mixtures of THPC and THPO predominating in THPO. Such mixtures can be prepared by mixing the individual compounds or by reacting THPC with a basic compound until a major proportion is converted to THPO. Illustrative examples of basic compounds with which THPC can be reacted to produce a mixture of THPC and THPO include: primary and secondary amines, such as, cetyl amine, diethanol amine, and the like, which also react with the phosphorus linked methylol groups to concurrently form modified phosphorus compounds; tertiary amines, such as, triethanolamine; and inorganic bases, such as, water soluble salts of carbonic acid, and the like.

The following examples are illustrative of details of the invention:

*Example 1*

6 parts (by weight) of phthalic anhydride, 2 parts of THPC and 0.2 part of concentrated sulfuric acid (as catalyst) were mixed together and heated to form a molten solution. The molten solution was heated for one hour. During this time some of the phthalic anhydride sublimed. When cooled to room temperature, the polymeric product was insoluble in water and the ordinary organic solvents. The polymer was flexible and slightly amber colored.

*Example 2*

11.1 parts of phthalic anhydride and 9.5 parts of THPC were mixed mechanically; then fused at about 120–130° C. The fused mixture was heated at this same temperature with vigorous stirring. 10 minutes after the fusion, sample A was removed. After 20 minutes, sample B was removed. The remainder of the sample was divided into two portions, C and D. Portion C was heated an additional 10 minutes, making a total of 30 minutes. Sample D was mixed with an amount of triethanolamine equivalent to 20% of the weight of the prepolymer and the mixture was heated 10 minutes at 130° C.

Description of polymers follow:

Samples A, B, and D were very viscous liquids and sample C was a flexible solid.

*Example 3*

11.1 parts of phthalic anhydride was fused with 7.0 parts of THPO at about 120–130° C. After fusion, the material was heated with stirring for an additional 10 minutes at 130° C. At this time sample A was removed. The remaining material was divided into samples B and C. Sample C was mixed with an amount of triethanolamine equivalent to 30% of weight of material and the mixture was heated 10 minutes at 130° C.

When cooled, the polymers A, B, and C were clear amber colored polymers. These materials were all water soluble. Samples A and C were more flexible than B, which was difficult to cut with a spatula.

*Example 4*

9 parts of sebacic acid and 5.7 parts of THPC were fused at 140–150° C. The fused mixture first formed two layers, then, after heating a few minutes longer at about 145° C., formed a liquid solution. At this time sample A was removed. The solution was heated an additional 10 minutes and sample B was removed.

Both samples A and B solidified at 85–100° C. and became opaque. Both samples were insoluble in water.

*Example 5*

3 parts of chlorendic anhydride (the anhydride of 1,4,5,6,7,7 - hexachlorobicyclo - [2,2,1] heptene-2,3-dicarboxylic acid) and 1 part of THPC were mixed together and heated to form a molten mixture. The molten mixture was heated for 7 to 10 minutes then cooled to room temperature. A clear, hard and brittle solid resin formed. While the polymer was in the molten state, long filaments could easily be drawn.

The clear solid resin was soluble in acetone and toluene, but was insoluble in water. The resin would not support combustion.

*Example 6*

3 parts of chlorendic anhydride and ⅔ parts of THPO were polyesterified as described in Example 5. The molten and solid polymer so produced had substantially the same properties as those described in Example 5.

*Example 7*

3 parts of chlorendic acid and 1 part of THPC were polyesterified as described in Example 5. The molten and solid polymer so produced had substantially the same properties as those described in Example 5.

*Example 8*

3 parts of chlorendic acid and ⅔ parts of THPO were polyesterified as described in Example 5. The molten and solid polymer so produced had substantially the same properties as those described in Example 5.

*Example 9*

One part of sample A from Example 3 was heated with one part of the resin from Example 5 until the mixture was a molten mass. The mixture was heated and stirred for 5 minutes. When cooled the resin had properties intermediate between those of sample A of Example 3 and those of the polymer described in Example 5.

As indicated in Example 1, above, the recited proportions in all of the foregoing examples are by weight of reactants. These constitute substantially equimolar proportions.

We claim:

1. A flame-resistant polymer consisting essentially of a polyester of substantially equimolar proportions of a polycarboxylic acid and at least one polyhydric phosphorus compound from the group consisting of tetrakis(hydroxymethyl) phosphonium chloride, tris(hydroxymethyl) phosphine oxide, and phosphorus-linked methylol group containing derivatives thereof, said derivatives containing, as the sole substituents reactive with said polycarboxylic acid, at least two =PCH$_2$OH groups and having been produced by heating, at a temperature from about room temperature to about 150° C., a mixture of a compound selected from the group consisting of tetrakis(hydroxymethyl) phosphonium chloride, tris(hydroxymethyl) phosphine oxide, and mixtures thereof, with a compound containing at least two members of the group consisting of hydrogen and —CH$_2$OH radicals attached to a trivalent nitrogen atom.

2. A process for producing a flame-resistant polymer comprising polyesterifying a polycarboxylic acid with substantially equimolar proportions of at least one hydroxyl-containing compound from the group consisting of tetrakis(hydroxymethyl) phosphonium chloride, tris(hydroxymethyl) phosphine oxide, and phosphorus-linked methylol group containing derivatives thereof, said derivatives containing, as the sole substituents reactive with said polycarboxylic acid, at least two ≡PCH$_2$OH groups and having been produced by heating, at a temperature from about room temperature to about 150° C., a mixture of a compound selected from the group consisting of tetrakis(hydroxymethyl) phosphonium chloride, tris(hydroxymethyl) phosphine oxide, and mixtures thereof, with a compound containing at least two members of the group consisting of hydrogen and —CH$_2$OH radicals attached to a trivalent nitrogen atom.

3. The polymers of claim 1, in which the polycarboxylic acid is 1,4,5,6,7,7-hexachlorobicyclo-[2,2,1] heptene-2,3-dicarboxylic acid.

4. The polymers of claim 1, in which the polycarboxylic acid is sebacic acid.

5. The polymers of claim 1, in which the polycarboxylic acid is phthalic acid.

6. A flame resistant polymer consisting essentially of a polyester of substantially equimolar proportions of 1,4,5,6,7,7 - hexachlorobicyclo - [2,2,1] heptene-2,3-dicarboxylic acid and a mixture of tetrakis(hydroxymethyl) phosphonium chloride and tris(hydroxymethyl) phosphine oxide.

7. A flame resistant polymer consisting essentially of a polyester of substantially equimolar proportions of sebacic acid and a mixture of tetrakis(hydroxymethyl) phosphonium chloride and tris(hydroxymethyl) phosphine oxide.

8. A flame resistant polymer consisting essentially of a polyester of substantially equimolar proportions of phthalic acid and a mixture of tetrakis(hydroxymethyl) phosphonium chloride and tris(hydroxymethyl) phosphine oxide.

References Cited in the file of this patent

UNITED STATES PATENTS 2,646,420    Morgan _____ July 21, 1953

OTHER REFERENCES

Houston: J. Am. Chem. Soc., May 1946, page 914.